April 16, 1929.   V. BUSH   1,709,427
ELECTRICAL CONDENSER
Filed March 16, 1927

Inventor
Vannevar Bush,
by Roberts Cushman & Woodbury.
his Attorneys.

Patented Apr. 16, 1929. 1,709,427

UNITED STATES PATENT OFFICE.

VANNEVAR BUSH, OF WEST MEDFORD, MASSACHUSETTS, ASSIGNOR TO RAYTHEON INC., OF CAMBRIDGE, MASSACHUSETTS, A CORPORATION OF MASSACHUSETTS.

ELECTRICAL CONDENSER.

Application filed March 16, 1927. Serial No. 175,719.

The present invention relates to devices for storing electrical energy and in particular to the construction and manufacture of a condenser comprising electrodes contacting with an electrolyte and having thereon films, preferably formed by passing an electric current between the electrodes, the films serving as a dielectric of high inductive capacity, to retain electrostatic energy.

While my mode of manufacture has application to all condensers that utilize a dielectric derived by electrolysis, it has special adaptation to the type of condenser described and claimed in the Weaver application, Serial No. 150,484, filed November 24, 1926. The application identified discloses a capacitative device of the film type in which the active electrodal surfaces, i. e. the areas presented to the electrolyte, are effectively increased by placing in juxtaposition to the electrodes, a porous metallically conducting mass that allows ready passage of liquid to each plate. The presence of a quantity of steel wool or graphite, for example, was found to produce a phenomenal change in the ability of the condenser to absorb electrostatic energy. While my invention has particular adaptation to the device specifically disclosed in this application, it will be apparent that many of the features described hereinafter are also useful in film-type condensers that do not employ porous material for increasing the effective electrodal area.

The primary object of my invention is to provide a rugged condenser structure that offers simplicity of materials, cheapness and ease of manufacture in quantity production. Another object is to provide a self-contained liquid-containing condenser in which the main seal is provided by the electrode material. A more specific object is to provide an improved construction for housing the aforesaid porous material for increasing the effective plate area.

With these and other objects in view, my invention will be more fully described in relation to the specific embodiments illustrated on the drawing in which like reference characters designate corresponding elements throughout the several figures.

Fig. 2 shows in expanded form the several members comprising the condenser before assembly; while

Figure 3:
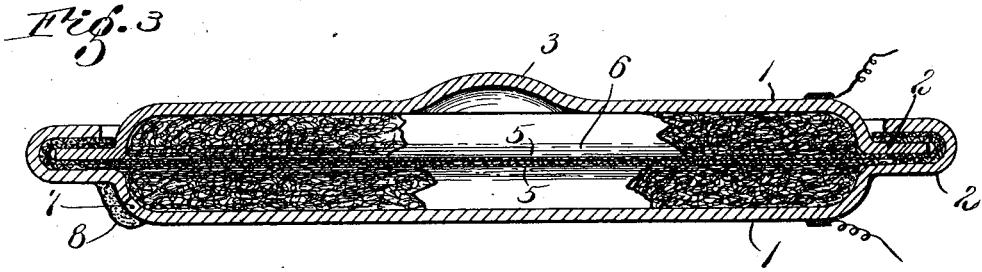
Fig. 3 is a section taken along line 3—3 of Fig. 1.

In the figures, numeral 1 designates two electrodes of film-forming material as steel, tin, iron silicon alloy, nickel or one of its alloys, each of which are characterized by chemical inertness with respect to the electrolyte employed even when subjected to electric potential. Cold rolled sheet steel appears the most satisfactory, because it can be worked with facility. The steel sheets are relatively thin and preferably punched to dish-like shape with wide extending flanges 2. As shown in Fig. 3, one of the flanges is of sufficient diameter to completely embrace the other when the electrodes are placed together to form a container. In order to insure good electrical contact between condensers when several are used in series, one of the punchings may include a small circular protruding portion 3. Moreover, for this purpose, a thin copper plating may be applied to the exterior of one or both electrodes. By numeral 4, I have indicated a quantity of electrically conducting porous substance, as steel wool preferably of fine strand and in stiff pad form for convenience in handling, having aggregate surfaces considerably larger than the projected area. The diameter and thickness of the pads when strongly compressed should preferably conform as closely as possible to the inner diameter and depth respectively of each half-container.

Between the wool members, several layers 5 of absorbent material, such as paper or cloth, are preferably inserted, a closely woven cotton cambric unbleached and chemically clean being preferable. The cloth should be of a size to overlap the edge of the crimped portion after assembly to insure complete insulation between the upper and lower electrodes.

The electrolyte should possess conductivity in substantial degree and may comprise mildly acid solutions such as bichromates, neutral solutions such as chromates, mildly alkaline solutions such as the carbonates, borates, oxalates, acetates and dibasic phosphates of the alkali metals in general, or strongly alkaline solutions such as the hydroxides or tribasic phosphates. However, I prefer a solution of potassium carbonate ($K_2CO_3$). To this salt I prefer to add a small amount of potassium chromate ($K_2CrO_4$) or dichromate ($K_2Cr_2O_7$) to minimize corrosion of the electrode materials. For clearness I have indicated the electrolyte by horizontal lines 6 exterior to the absorbent material, although it will be understood that all or practically all the liquid is absorbed by the wool mass and the cambric separator.

Figure 1:
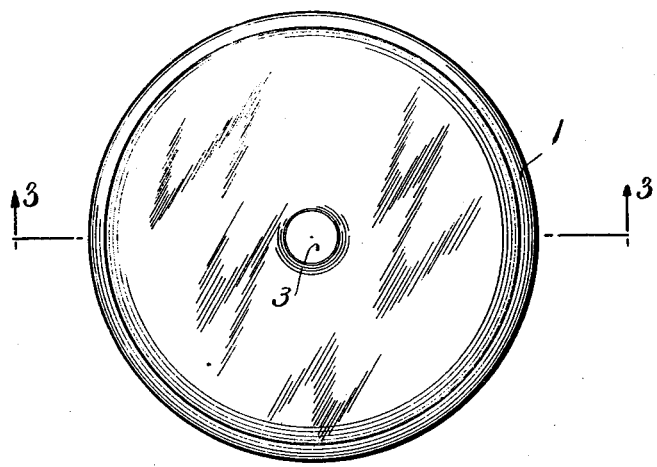
Fig. 1 represents the top plan view of the assembled condenser.
Figure 2:
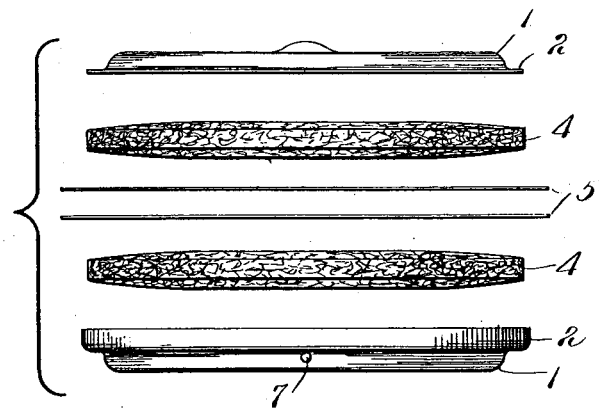

In the manufacture of these condenser units, the various elements are assembled in the order indicated in Fig. 2, i. e. beginning with the electrode of larger diameter and ending with the top plate, after which both halves are pressed together to give solidarity to the pile. A follow-up press may then crimp the rim of the layer plate at an angle sufficient to hold the parts together temporarily. Another method is to completely fold the edge of one electrode about the other by crimping at spots, usually three places equidistantly spaced about the periphery is sufficient. The next step is that of applying by brush, wick or otherwise an electrolyte-resisting varnish or other compound to the projecting edges of the cambric. The final crimping is then performed which serves to press the members tightly together and to clamp the edge of cambric between the electrodes. In order to admit electrolyte and anti-corrosive agent, access to the container may be had through a readily sealable aperture 7. While various ways will suggest themselves to those skilled in the art, I find that the most satisfactory method is to first affix a globule of solder 8 to the surface of the container and then drill a pin-hole through the solder and electrode material. The container may then be partially filled by suction or otherwise and heated to the boiling point of the electrolyte in order to insure the expulsion of all air by a flow of steam. The aperture is then quickly submerged in cold electrolyte, which completely fills the unit. The pin-hole is then sealed while the condenser is under pressure as in a vise by spotting the solder with an iron.

The method described is simple, requires little assembly apparatus and lends itself readily to quantity production. The resulting condenser has relatively large capacity per unit of weight or of volume and is self-contained, rugged, provides a liquid seal between halves and is particularly adapted for use with low voltages. When four or five units are connected in series, there is still considerable capacity. Thus the multi-cell unit functions admirably as a low impedance shunt for current ripples ordinarily present in the output circuit of a rectifier supplying a thermionic tube filament circuit of standard potential.

I claim:

1. A condenser comprising a plurality of electrodes having associated portions, said electrodes being secured together to form a self-contained receptacle, an electrolyte in said receptacle and means in each of said portions for increasing the electrodal area offered to the electrolyte, said means comprising a mass of metal wool.

2. An electrical condenser comprising a plurality of electrodes and an electrolyte, said electrodes having portions thereof in finely divided form.

3. An electrical condenser comprising a plurality of electrodes and electrolyte, one of said electrodes having portions thereof composed of steel wool.

4. An electrical condenser comprising a plurality of electrodes, and an alkaline electrolyte therefor, said electrodes having portions thereof in a finely divided form.

5. An electrical condenser comprising a plurality of electrodes, and an alkaline electrolyte therefor, said electrodes having portions thereof composed of steel wool.

Signed by me at Cambridge, Massachusetts, this 12th day of March, 1927.

VANNEVAR BUSH.